(12) United States Patent
Tien et al.

(10) Patent No.: US 12,493,031 B2
(45) Date of Patent: Dec. 9, 2025

(54) DIAGNOSTIC TESTING DEVICE AND DIAGNOSTIC TESTING METHOD

(71) Applicant: DENKA COMPANY LIMITED, Tokyo (JP)

(72) Inventors: Chihfang Tien, Niigata (JP); Risa Kohiyama, Niigata (JP); Tomomi Takano, Niigata (JP); Takashi Miyazawa, Niigata (JP)

(73) Assignee: DENKA COMPANY LIMITED, Tokyo (JP)

( * ) Notice: Subject to any disclaimer, the term of this patent is extended or adjusted under 35 U.S.C. 154(b) by 1001 days.

(21) Appl. No.: 17/279,957

(22) PCT Filed: Sep. 24, 2019

(86) PCT No.: PCT/JP2019/037185
§ 371 (c)(1),
(2) Date: Mar. 25, 2021

(87) PCT Pub. No.: WO2020/066973
PCT Pub. Date: Apr. 2, 2020

(65) Prior Publication Data
US 2022/0034878 A1    Feb. 3, 2022

(30) Foreign Application Priority Data
Sep. 28, 2018  (JP) .................. 2018-183983

(51) Int. Cl.
*G01N 33/543* (2006.01)
*G06T 7/00* (2017.01)

(52) U.S. Cl.
CPC ..... *G01N 33/54388* (2021.08); *G06T 7/0012* (2013.01); *G06T 2207/10024* (2013.01); *G06T 2207/30004* (2013.01)

(58) Field of Classification Search
CPC ........ A61K 2039/505; A61K 2039/507; A61K 2039/525; A61K 39/12; A61K 39/395;
(Continued)

(56) References Cited

U.S. PATENT DOCUMENTS

2006/0188395 A1    8/2006  Taniike et al.
2006/0197955 A1    9/2006  Koike
(Continued)

FOREIGN PATENT DOCUMENTS

CN    108139331 A    6/2018
EP    3361238 A1     8/2018
(Continued)

OTHER PUBLICATIONS

Dec. 24, 2019 Search Report issued in International Patent Application No. PCT/JP2019/037185.
(Continued)

*Primary Examiner* — Kathryn Elizabeth Limbaugh
(74) *Attorney, Agent, or Firm* — Oliff PLC

(57) ABSTRACT

A diagnostic testing device is a testing-device for immunochromatography wherein a liquid sample contains an analyte developed in a detection area via a labeling-substance-containing area of a test strip, and a negative or positive interpretation is made from the coloration exhibited by the detection area. The device includes a measuring part for obtaining data on a coloration index associated with coloration state for at least part of the detection area, and a processing part that interprets based on the coloration index data. The processing part delivers a negative interpretation if the coloration state of the analyte detection area is in a negative state in at least one image out of a maximum of N (wherein N is greater than 1) obtained images, and delivers a positive assessment if the coloration state of the analyte detection area is in a positive state in all N images.

11 Claims, 10 Drawing Sheets

(58) Field of Classification Search
CPC .... G01N 33/54388; G06T 2207/10024; G06T 2207/30004; G06T 7/0012
See application file for complete search history.

(56) References Cited

U.S. PATENT DOCUMENTS

| | | | |
|---|---|---|---|
| 2013/0230844 A1* | 9/2013 | Egan | ................ G01N 33/54366 435/5 |
| 2018/0299385 A1 | 10/2018 | Honda et al. | |
| 2019/0369094 A1 | 12/2019 | Ishikawa et al. | |

FOREIGN PATENT DOCUMENTS

| | | |
|---|---|---|
| JP | 2004-264065 A | 9/2004 |
| JP | 2009-133813 A | 6/2009 |
| JP | 2011-174865 A | 9/2011 |
| WO | 2005/075979 A1 | 8/2005 |
| WO | 2017/061494 A1 | 4/2017 |
| WO | 2018/150860 A1 | 8/2018 |

OTHER PUBLICATIONS

May 27, 2022 Extended European Search Report issued in Patent Application No. 19866731.3.
Mar. 23, 2021 International Preliminary Report on Patentability issued in International Patent Application No. PCT/JP2019/037185.

* cited by examiner

Fig. 5

|   | Coloration state (Primary interpretation) | | Secondary Interpretation |
|---|---|---|---|
|   | First time | Second time |   |
| 1 | + | + | Positive |
| 2 | + | − | Negative |
| 3 | − | + | Negative |
| 4 | − | − | Negative |

DIAGNOSTIC TESTING DEVICE AND DIAGNOSTIC TESTING METHOD

TECHNICAL FIELD

The present invention relates to technology of identifying a test result from an image of a test strip in testing by immunochromatography.

BACKGROUND ART

When interpreting whether or not analytes such as bacteria or viruses or the like are contained (negative/positive) in a sample, such as saliva or the like of a patient, testing by immunochromatography is performed. A test kit, provided with a test strip that exhibits coloration of a different color in a detection area, depending on whether or not the analyteis present or absent, is used for testing by immunochromatography.

A drop area, a labeling-substance-containing area, and a detection area are provided on the test strip in order from the upstream thereof in the direction in which a liquid sample that potentially contains an analyte flows (hereinafter also referred to as "sample flow"). The drop area is an area for dropping the liquid sample. The liquid sample dropped onto the drop area migrates as sample flow. The labeling-substance-containing area is an area that contains a labeling substance that selectively binds to the analyte and also serves as a label. The labeling substance is a label of a particular color, and binds to the analyte (in most case, antigen) by antigen-antibody reaction when mixed with the liquid sample. When the liquid sample passes the labeling-substance-containing area, the labeling substance binds to the analyte contained in the liquid sample. The detection area is an area where an immobilizing substance that immobilizes the analyte bound to the labeling substance is fixed. Upon reaching the detection area, the analyte that is bound to the labeling substance is selectively bound to the immobilizing substance, and is immobilized there. The detection area where the analyte bound to the labeling substance is immobilized and accumulated exhibits coloration of a predetermined color by the labeling substance. A tester visually observes the detection area, and makes a negative or positive judgment from the coloration state.

Also, in some medical settings, a diagnostic testing device has been introduced to reduce the workload on testers. The diagnostic testing device obtains the image of the detection region of a test strip from a test kit that is inserted, makes a negative or positive interpretation by image processing, and presents an assessment result (see PTL 1).

CITATION LIST

Patent Literature

[PTL 1]
Japanese Patent Application Publication No. 2009-133813

SUMMARY OF INVENTION

Technical Problem

The usefulness of automatic interpretation by diagnostic testing devices is dependent on the speed and accuracy of testing.

It is an object of the present invention to provide technology that enables usefulness of testing and interpretation by equipment to be improved.

Solution to Problem

A diagnostic testing device according to the present disclosure is a testing-assessment device for immunochromatography, in which a liquid sample that potentially contains an analyte (in most cases, antigen) is migrated in an antigen detection area via a labeling-substance-containing area of a test strip, and an interpretation of negative or positive is made on the basis of a coloration state exhibited by the antigen detection area. The diagnostic testing device includes a measuring part configured to obtain, once or more, data on a coloration index constituting an index associated with a coloration state for a range including at least part of the analyte detection area, and a processing part configured to deliver interpretation on the basis of the coloration index data. The processing part is configured to deliver a negative interpretation when the coloration state of the analyte detection area is in a negative state in data of the coloration index obtained at least one time with a maximum set to N times (wherein N is greater than 1), and deliver a positive assessment when the coloration state of the analyte detection area is in a positive state in data of the coloration index of all of the N times.

Advantageous Effects of Invention

According to the present disclosure, usefulness of testing and interpretation by equipment can be improved.

BRIEF DESCRIPTION OF DRAWINGS

FIG. 5 is an interpretation table in a case in which N=2.

DESCRIPTION OF EMBODIMENTS

An embodiment of the present invention will be described below with reference to the figures.

Figure 1:
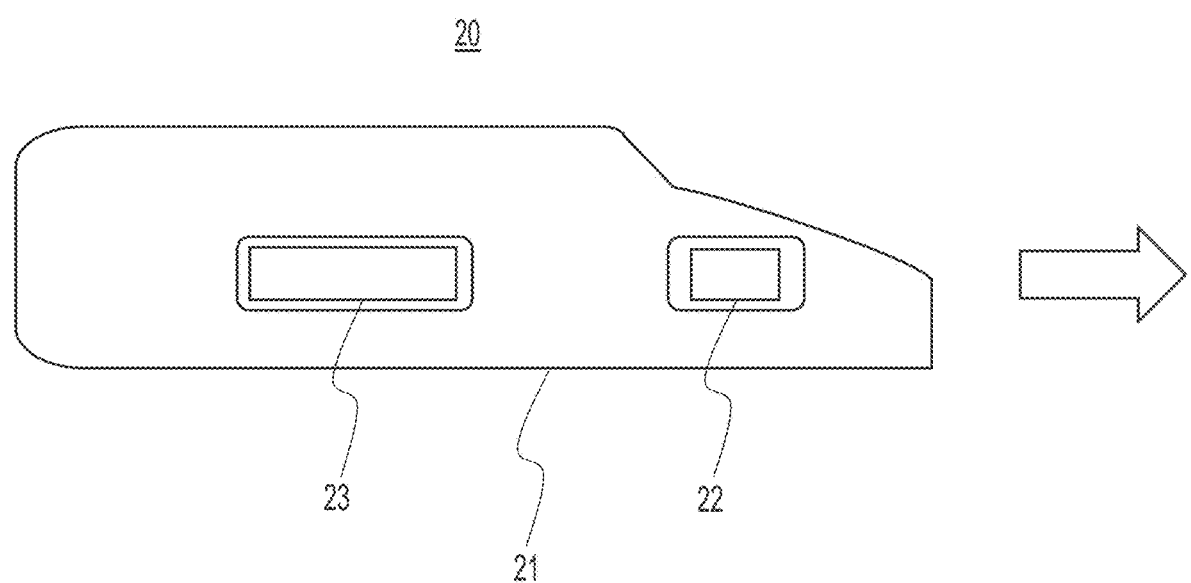
FIG. 1 is a planar view of a test kit.
Figure 2:
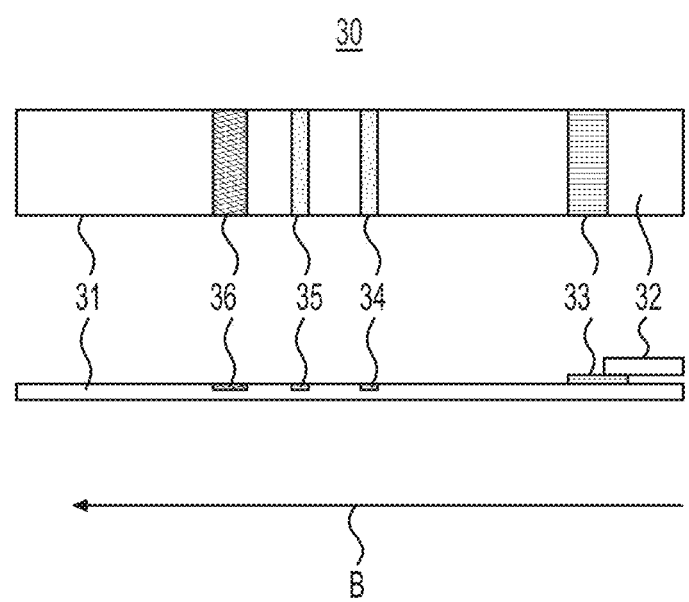
FIG. 2 is a two-view diagram of a test strip.

FIG. 1 is a planar view of a test kit used in the present embodiment. FIG. 2 is a two-view diagram of a test strip. The upper side is a planar view, and the lower side is a side view. The test kit 20 is a tester for testing for Type A influenza and Type B influenza by immunochromatography. It is needless to say that the configurations in FIG. 1 and FIG. 2 are exemplary. The test kit 20 is configured with a test strip 30 provided within an enclosure 21.

The test strip 30 is configured having a sample developing membrane 31, a sample drop pad 32, and a labeling-substance-containing pad 33, as illustrated in FIG. 2.

The sample developing membrane 31 and the labeling-substance-containing pad 33 are coupled such that the entire bottom face of the labeling-substance-containing pad 33 overlays the sample developing membrane 31. The labeling-substance-containing pad 33 and the sample drop pad 32 are coupled such that part of the upper face of the labeling-substance-containing pad 33 overlaps part of the lower face of the sample drop pad 32. The sample drop pad 32 and the sample developing membrane 31 are not directly in contact.

Arrayed on the sample developing membrane 31, downstream of the labeling-substance-containing pad 33 in a sample flow B indicated by an arrow, are a first analyte detection area 34, a second analyte detection area 35, and a sample developing detection area 36, in that order and isolated from each other.

With reference to FIG. 1, an opening part 22 and a result window 23 are provided to the enclosure 21 of the test kit 20. The opening part 22 is a through hole that exposes at least part of the upper face of the sample drop pad 32, so that the liquid sample can be dripped on the sample drop pad 32 of the test strip 30 built into the enclosure 21. The result window 23 is a window provided so that at least part of each of the first analyte detection area 34, the second analyte detection area 35, and the sample developing detection area 36 can be externally viewed, such that the coloration state of the first analyte detection area 34, the second analyte detection area 35, and the sample developing detection area 36 is visually recognizable. The result window 23 may be a through hole in the same way as with the opening part 22, or may be a structure where a through hole is closed off by a transparent member.

Upon dropping the liquid sample from the opening part 22 onto the sample drop pad 32, the liquid sample develops (flows) in the expanding direction B. The labeling-substance-containing pad 33 contains a labeling substance that selectively binds to the analyte and also serves as a label. The analyte here is the two types of Type A influenza virus and Type B influenza virus, and accordingly two types of labeling substances that selectively bind thereto are contained in the labeling-substance-containing pad 33.

Hereinafter, Type A influenza virus will also be referred to as first analyte, and Type B influenza virus will also be referred to as second analyte. Also, Type A influenza virus and Type B influenza virus may be collectively referred to simply as analyte. If an analyte is contained in the liquid sample flowing over the labeling-substance-containing pad 33, the labeling substance will bind to the analyte, and flow downstream over the sample developing membrane 31 along with the analyte.

Also, the labeling-substance-containing pad 33 further contains a developing-detecting labeling substance that selectively binds to a developing detecting substance. When the liquid sample flows over the labeling-substance-containing pad 33, the detecting substance flows downstream over the sample developing membrane 31 along with the liquid sample. Binding of the developing detecting substance and the developing detecting labeling substance will be described later.

The liquid sample flows downstream over the sample developing membrane 31, and eventually reaches the first analyte (in this case, analyte=antigen) detection area 34. An immobilizing substance that binds to the first analyte is fixed to the first analyte detection area 34. When the liquid sample containing the first analyte bound to the labeling substance flows over the first analyte detection area 34, the first analyte bound to the labeling substance binds to the immobilizing substance, and is immobilized at the first analyte detection area 34. When the first analyte bound to the labeling substance is accumulated at the first analyte detection area 34, the first analyte detection area 34 exhibits a predetermined coloration state that is visually recognizable. Specifically, the first analyte detection area 34 changes to the color of the labeling substance. This coloration state indicates positive for Type A influenza.

The liquid sample further flows downstream over the sample developing membrane 31, and eventually reaches the second analyte (in this case, analyte=antigen) detection area 35. An immobilizing substance that binds to the second analyte is fixed to the second analyte detection area 35. When the liquid sample containing the second analyte bound to the labeling substance flows over the second analyte detection area 35, the second analyte bound to the labeling substance binds to the immobilizing substance, and is immobilized at the second analyte detection area 35. When the second analyte bound to the labeling substance is accumulated at the second analyte detection area 35, the second analyte detection area 35 exhibits a predetermined coloration state that is visually recognizable. Specifically, the first analyte detection area 34 changes to the color of the labeling substance. This coloration state indicates positive for Type B influenza.

The liquid sample further migrates downstream over the sample developing membrane 31, and eventually reaches the sample developing detection area 36. The developing-detecting substance that selectively binds to the developing-detecting labeling substance is fixed to the sample developing detection area 36. When the liquid sample flows over the sample developing detection area 36, the sample developing-detecting labeling substance that the liquid sample contains binds to the sample developing-detecting substance, and is immobilized at the sample developing detection area 36. When the sample developing-detecting labeling substance is accumulated at the sample developing detection area 36, the sample developing detection area 36 exhibits a predetermined coloration state that is visually recognizable. This coloration state indicates that the liquid sample has passed over the first analyte detection area 34 and the second analyte detection area 35 and expanded to the sample developing detection area 36.

Figure 3:
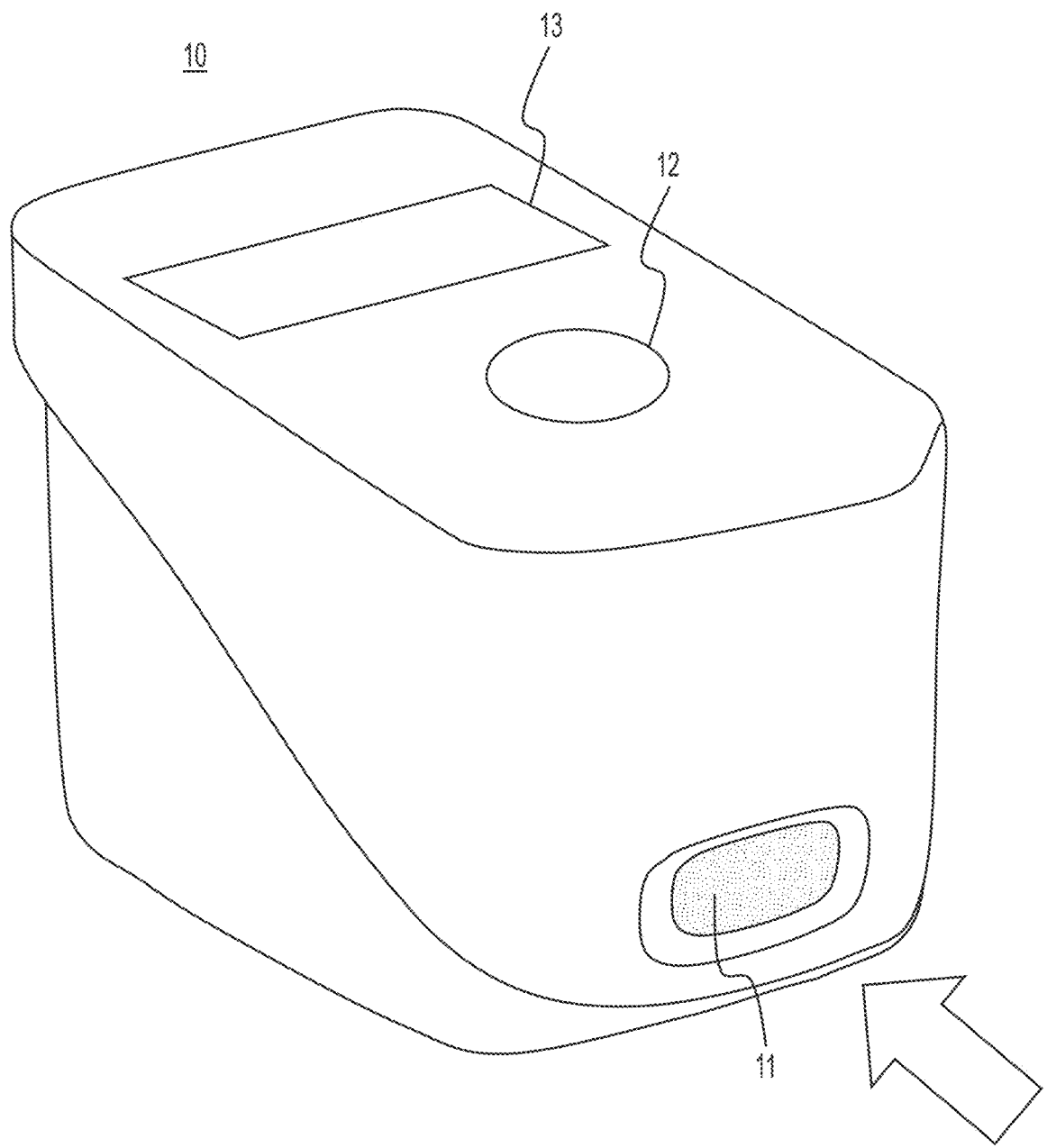
FIG. 3 is a perspective view of a diagnostic testing device.

FIG. 3 is a perspective view of a testing-assessment device according to the present embodiment. The diagnostic testing-device 10 is a device that executes the interpretation of the test kit 20 described above, and displays interpretation results. With reference to FIG. 3, the diagnostic testing device 10 has a slot 11, an operation button 12, and an display 13. A user inserts the test kit 20 from the slot 11 so as to be loaded to a predetermined position, and operates the operation button 12, upon which the diagnostic testing device 10 measures the coloration state of the test strip 30 through the result window 23 of the test kit 20, performs interpretation of whether positive or negative regarding the first antigen and the second analyte, on the basis of the testing results, and displays the results on the display 13.

Figure 4:
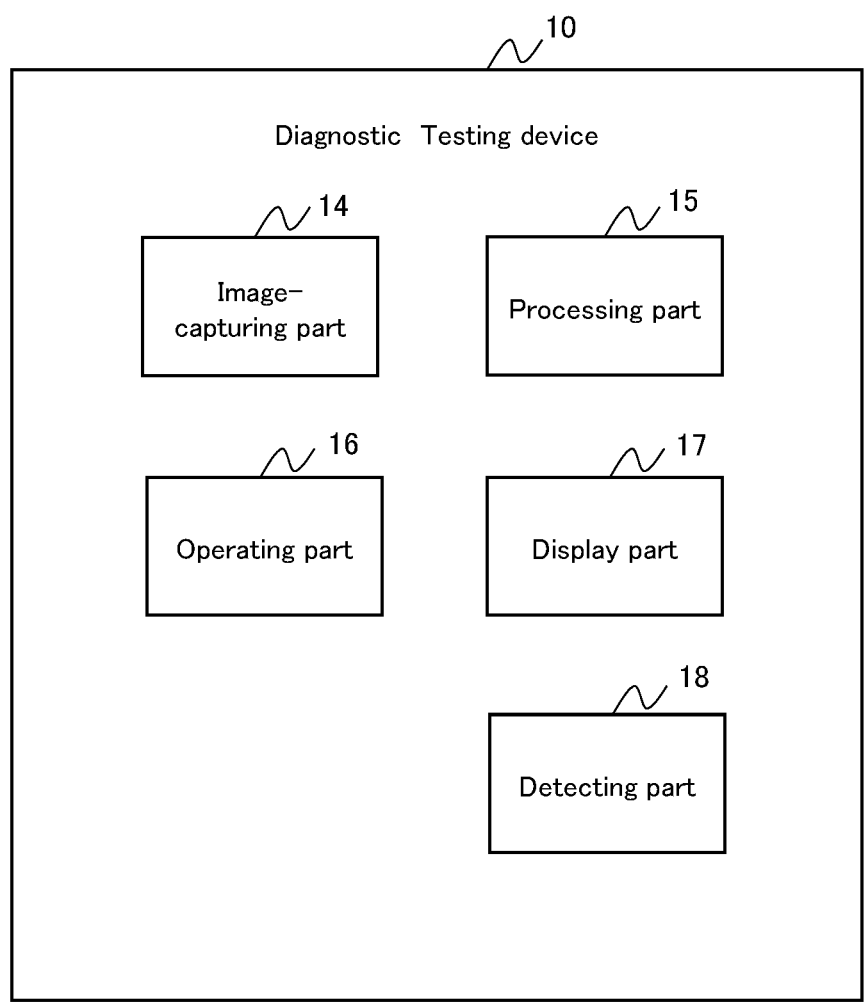
FIG. 4 is a block diagram of the diagnostic testing device.

FIG. 4 is a block diagram of the diagnostic testing device. With reference to FIG. 4, the diagnostic testing device 10 has an image-capturing part 14, a processing part 15, an operating part 16, a display part 17, and a detecting part 18.

The image-capturing part 14 is an image-capturing device that obtains images of the test strip 30 viewed through the result window 23 of the test kit 20 loaded to the predetermined position. For example, the image-capturing part 14 includes a photoemitter (omitted from illustration) and a photoreceptor (omitted from illustration), casts light onto the result window 23 from the photoemitter, and receives reflected light from the result window 23 by the photoreceptor. As one example, the photoemitter may be configured of an LED. The photoreceptor may be configured of a CMOS image sensor. As described above, the result window 23 is provided such that at least part of each of the first analyte detection area 34, the second analyte detection area 35, and the sample developing detection area 36 is externally visible, so by performing image-capturing of a range including the entire result window 23, an image including at least part of each of the first analyte detection area 34, the second analyte detection area 35, and the sample developing detection area 36 can be obtained. Here, it is sufficient to obtain an image of a part to where the coloration state of the first analyte detection area 34, the second analyte detection area 35, and the sample developing detection area 36 can be assessed. An arrangement may be made in which a predetermined barcode is printed on a sticker, the sticker is applied to a predetermined position near the result window 23 of the enclosure 21 of the test kit 20, and the range for obtaining the image is decided with the barcode on this sticker as a reference.

Alternatively, the range for obtaining the image may be decided with a shape of the result window 23 decided in advance as a reference. Alternatively, the range for obtaining the image may be fixedly decided with regard to the position where the result window 23 is situated when the test kit 20 is loaded to the diagnostic testing-device 10.

Note that in the present embodiment, as one example, the image-capturing part 14 is an image-capturing device that obtains coloration indices (pixel values) for the entire image at the same time, like a CMOS image sensor, but other configurations may be made. As another example, a scanning device may be used that scans over a range including the result window 23, and receives reflected light of particular wavelengths, thereby sequentially obtaining coloration indices indicating coloration states of the particular wavelengths at each of the parts within the range, which are then handed to the processing part 15 as digital data or image data. In a case of using different colors for each of the first analyte detection area 34, the second analyte detection area 35, and the sample developing detection area 36, scanning is performed for each color, and reflected light is received for each color wavelength.

The processing part 15 is a device that performs interpretation by executing various types of processing on the basis of operations performed as to the operating part 16, and displays interpreting results on the display part 17. For example, the processing part 15 is a microcomputer that has a processor (omitted from illustration) and memory (omitted from illustration), and that executes software programs stored in the memory. The software programs may include firmware and applications. Details of various types of processing that the processing part 15 executes will be described later.

The operating part 16 is a device that communicates, to the processing part 15, operations that the user has performed. For example, the operating part 16 is a press-switch (omitted from illustration) that can assume two states, which are a pressed state and an unpressed state, and that communicates the state thereof to the processing part 15. The processing part 15 can comprehend various types of operations from the state of the operating part 16, such as long-press, short-press, double-press, and so forth.

The display part 17 is a device that displays characters, symbols, images, and so forth, under instruction from the processing part 15. For example, the display part 17 is a liquid crystal indictor (omitted from illustration).

The detecting part 18 is a sensor that detects whether or not the test kit 20 is loaded to the slot 11, and communicates to the processing part 15.

Operations of the diagnostic testing device 10 will be described below

The diagnostic testing device 10 has an operation mode in which immediate interpretation is made regarding a test kit 20 in which the liquid sample has sufficiently flowed over the test strip 30 and the coloration state has stabilized (hereinafter also referred to as "first operation mode"), and an operation mode in which the coloration state of the test kit 20 that changes from minute to minute is continuously measured and interpreted from immediately after dropping the liquid sample onto the test strip 30 (hereinafter also referred to as "second operation mode"). The operation of interpreting the coloration state from images of the test strips 30 (hereafter also referred to as "basic operation") is common to both the first operation mode and the second operation mode. When the test kit 20 is removed partway through the second operation mode, the diagnostic testing device 10 performs a predetermined operation (hereinafter also referred to "abnormal-state operation").

Hereinafter, each of the basic operation, the first operation mode, the second operation mode, and the abnormal-state operation will be described.

<Basic Operation>

As the basic operation, when the coloration state of an analyte detection area (indicating the first analyte detection area 34 and/or the second analyte detection area 35) in at least one image obtained with a maximum set to N (wherein N is greater than 1) is in a negative state, the processing part 15 interprets this to be negative, and when the coloration state of the analyte detection area in all N images is in a positive state, interprets this to be positive.

Depending on the state of the sample provided for the test, there are cases in which the liquid sample contains a viscous component, causing a partial stagnation of flow in the liquid sample due to effects of the viscous component, with part of the liquid sample and the labeling substance flowing to the analyte detection area in a delayed manner. When an image of the analyte detection area is obtained while the delayed liquid sample is passing therethrough, a coloration state is manifested, in which an erroneous interpretation of positive may be made, i.e., false-positive. If there is no analyte, the labeling substance is not immobilized at the analyte detection area, and accordingly once the liquid sample finishes flowing, the coloration state reverts to the original state. According to the basic operation of the present embodiment, a negative interpretation is made when the coloration state in at least one image is in a negative state, and a positive interpretation is made when the coloration state in all of the maximum N images is in a positive state, and accordingly erroneous interpretation can be reduced. The accuracy of interpretation is improved, and the usefulness of testing and interpretation by diagnostic testing devices can be improved.

In the present embodiment, the basic operation includes the image-capturing processing of obtaining an image of the test strip 30, and interpretation processing of interpreting whether negative or positive from the obtained image. In the image-capturing processing, the image-capturing part 14 obtains images including the analyte detection area for N times, under instructions from the processing part 15. In the interpretation processing, the processing part 15 interprets the coloration state of the analyte detection area for each of the N image that are obtained, and if in a negative state is included in a combination of coloration states in more than one images, interpretation of negative is made, while interpretation of positive is made if all are in a positive state. interpretation is made regarding whether negative or positive on the basis of a combination of coloration states in more than one images, and accordingly accuracy improves through interpretation performed by simple processing, and the usefulness of testing and interpretation by diagnostic testing devices can be improved.

As a specific example of N=2, the image-capturing part 14 obtains images including the analyte detection area two times, the processing part 15 performs primary interpretation of whether the coloration state of each of the analyte detection areas in the two images is in a negative state or in a positive state, performs secondary interpretation of positive if both of the primary interpretation results of the two images are in a positive state, and performs secondary interpretation of negative if at least one is in a negative state. The processing part 15 may have an interpretation table prepared in advance to obtain secondary assessment from the results of the primary interpretation, for example, and perform secondary interpretation with reference to this interpretation table.

FIG. 5 is an interpretation table in a case where N=2. The interpretation table correlates the results of the first primary interpretation (coloration state of first image), the results of the second primary interpretation (coloration state of second image) and results of the secondary interpretation. In the figure, the "+" indicates a positive state, and the "−" indicates a negative state. The secondary interpretation is positive only in a case where both the first primary interpretation and the second primary interpretation are positive, and the secondary interpretation is negative in the case of all other combinations. The likelihood of an erroneous interpretation of positive being made, i.e., false-positive, is reduced by performing interpretation using two images, and accordingly both accuracy and swiftness of the interpretation can be realized. The time interval used between the two times of image capturing preferably is a value adjusted appropriately in accordance with the time for false-positive to be manifested or the time for stagnation of the labeling substance actually used in the test kit 20. For example, this may be around three seconds.

Note that while an example has been shown in the present embodiment in which primary interpretation is performed N times and thereafter secondary interpretation is performed, other examples may be made. As another example, the processing part 15 may perform primary interpretation of the coloration state of analyte detection areas in images in the order of obtaining by the image-capturing part 14, and if there is an image interpreted to be negative in the primary-interpretation, may perform secondary interpretation of negative at that stage. Performing primary interpretation in the order of obtaining images, and performing secondary interpretation of negative at the stage at which there is an image interpreted to be negative, enables swift interpretation while reducing false-positive interpretation.

Figure 6:
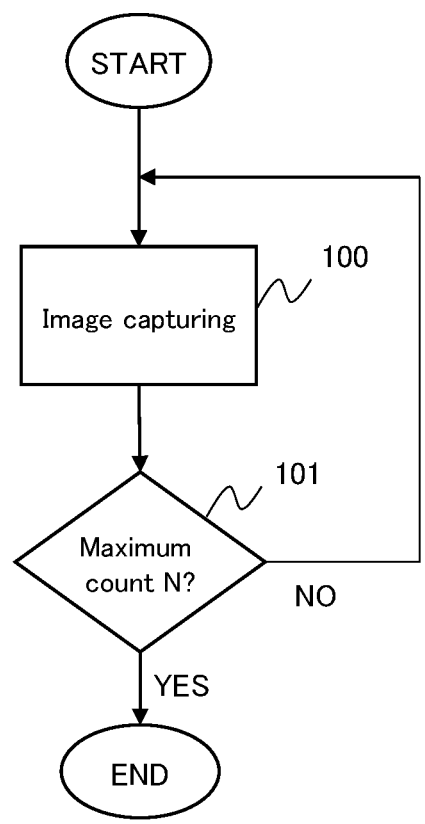
FIG. 6 is a flowchart of image-capturing processing.

FIG. 6 is a flowchart of image-capturing processing.

In step 100, the processing part 15 instructs the image-capturing part 14 to perform image-capturing of an image including the antigen detection area visible through the result window 23. To simplify description, description will be made that there is one antigen detection area for antigen detection.

Next, in step 101, the processing part 15 interprets whether the count of times of image capturing has reached the predetermined maximum N times (two times here). If the count of times of image capturing has reached N times, the processing part 15 ends the processing, and if the count of times of image capturing has not reached N times, returns to step 100.

Figure 7:
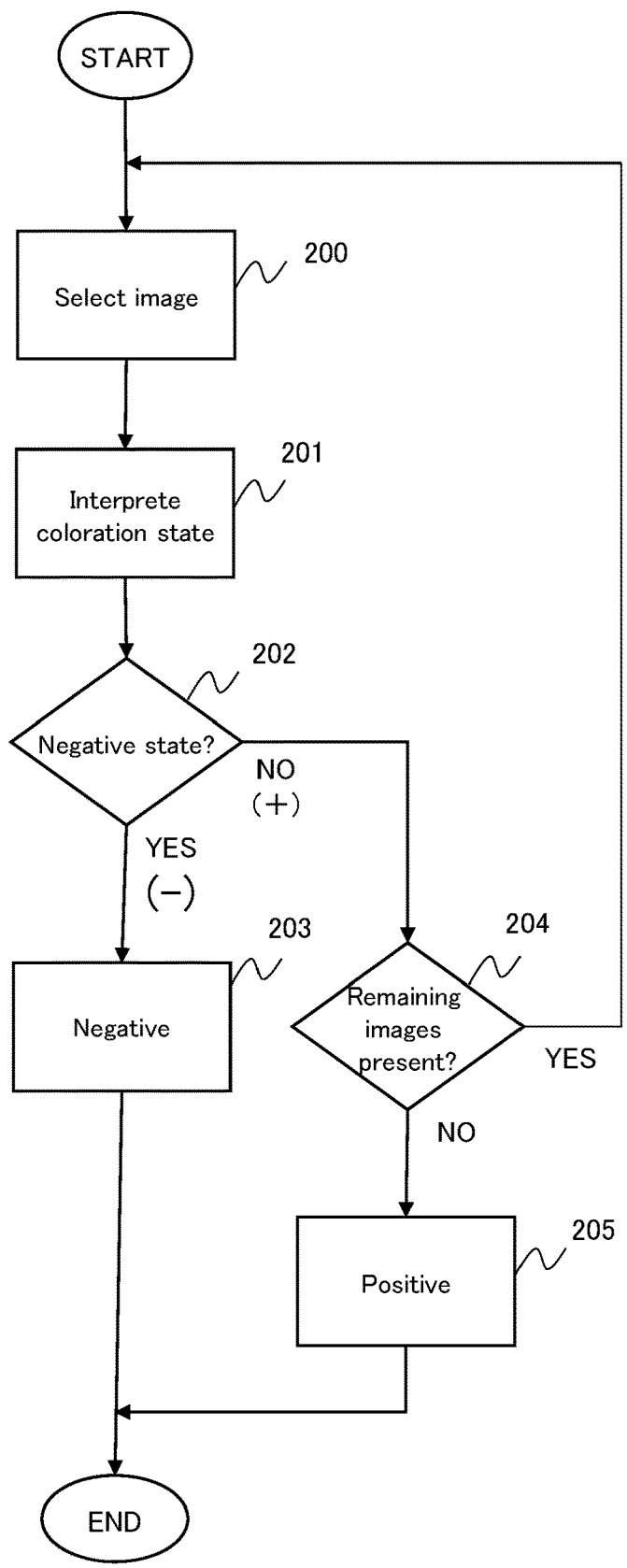
FIG. 7 is a flowchart of assessment processing.

FIG. 7 is a flowchart of assessment processing.

In step 200, the processing part 15 selects one image of the N images image-captured by the image-capturing part 14.

Next, in step 201, the processing part 15 interprets the coloration state of the analyte detection area included in the selected image. At this time, the processing part 15 compares a value of a coloration index that is an index relating to the coloration state of the analyte detection area with a predetermined coloration threshold value for interpreting whether in a negative state or in a positive state.

In an arrangement in which the coloration index is an index that indicates a higher value for positive than for negative, interpretation is made of a positive state if the coloration index exceeds the coloration threshold value, and interpretation is made of a negative state if the coloration index is equal to or smaller than the coloration threshold value. Conversely, in an arrangement in which the coloration index is an index that indicates a higher value for negative than for positive, interpretation is made of a negative state if the coloration index exceeds the coloration threshold value, and interpretation is made of a positive state if the coloration index is equal to or smaller than the coloration threshold value.

The coloration index is an index indicating the coloration state on the basis of pixel values or luminosity of each pixel in the analyte detection area in the image. Also, an arrangement may be made where the image-capturing part 14 is a device that uses densimetery, and the coloration index is reflection intensity or absorbance of a predetermined wavelength, concentration (density) of the labeling substance that is the target component, or the like. In a case where the labeling substance is uniformly distributed, the absorbance is proportionate to the concentration of the labeling substance.

As a concrete example, the coloration index may be an index based on concentration of a predetermined color in accordance with the color of the labeling substance. For example, the concentration of blue (B) and green (G) may be used as the coloration state. Also, the concentration of red (R) and green (G) may be used as the coloration state. The coloration threshold value is a predetermined value that is suitable as a threshold value for the coloration index. For example, an arrangement may be made in which, with regard to each pixel in the analyte detection area, an average value of concentration of a predetermined color over a predetermined range before and after this pixel (upstream and downstream in the developing direction) is the coloration index, and if the height of a curve indicating the coloration index is equal to or larger than a predetermined coloration threshold value, interpretation of positive is made, and if smaller than the coloration threshold value, interpretation of negative is made.

Next, in step 202, the processing part 15 performs interpretation of whether the coloration state is in a negative state or not. If the coloration state is in a negative state, in step 203, the processing part 15 interprets the target test kit 20 to be negative.

If the coloration state is a positive state in step 202, in step 204, the processing part 15 interprets whether or not an unprocessed image remains out of the obtained images. If an unprocessed image remains, the processing part 15 returns to step 200, and selects the next image. If there is no unprocessed image remaining, this means that the coloration state of the analyte detection area has been interprets to be a positive state in all of the N images, and accordingly, in step 205, the processing part 15 interprets the target test kit 20 to be positive.

Although description has been made here that there is one analyte detection area for detection of the analyte, in order to simplify description as described above, this basically is the same in a case where there are more than one analyte detection areas. In the present embodiment, the assessment processing in FIG. 7 may be executed regarding each of the first analyte detection area 34 and the second analyte detection area 35. Also, an arrangement may be made that handles interpretation processing of both the first analyte detection area 34 and the second analyte detection area 35, and in this case, even when one of the first analyte detection area 34 and the second analyte detection area 35 is interprets to be negative first, the flow returns to step 200 for interpretation of the other analyte detection area, and processed to processing of the next image.

<First Operation Mode>

As described above, the first operation mode is an operation mode in which immediate interpretation is made regarding the test kit 20 in which the liquid sample dropped on the opening part 22 of the test kit 20 has sufficiently flowed over the test strip 30 and the coloration state has stabilized.

The user loads the test kit 20 to the diagnostic testing device 10 from the slot 11 and instructs starting of operations in the first operation mode by operating the operation button 12, whereupon the processing part 15 executes the processing of the first operation mode, and performs immediate interpretation of the test kit 20. In the first operation mode, the above-described basic operation is immediately performed one time by the processing part 15. Testing results regarding the target test kit 20 of whether positive or negative are obtained by the basic operation, and accordingly the processing part 15 displays the testing results on the display 13.

<Second Operation Mode>

As described above, the second operation mode is an operation mode in which the coloration state of the test kit 20 that changes from minute to minute is continuously measured and interprets from immediately after dropping the liquid sample onto the test strip 30.

The user loads the test kit 20 to the diagnostic testing device 10 from the slot 11 and instructs starting of operations in the second operation mode by operating the operation button 12, whereupon the processing part 15 executes the processing of the second operation mode, and performs assessment of the test kit 20.

In the second operation mode, the processing part 15 executes testing processing using the above-described basic operation. Specifically, the processing part 15 executes the image-capturing processing and the interpretation processing by the basic operation up to a predetermined maximum count that is M times (wherein M is greater than 1, e.g., five times) at predetermined time intervals (e.g., one minute), finalizes interpretation of positive at the stage of interpretation of positive being made in the interpretation processing thereof, and finalizes interpretation of negative when interpretation of negative is made in all M times of the interpretation processing.

Figure 8:
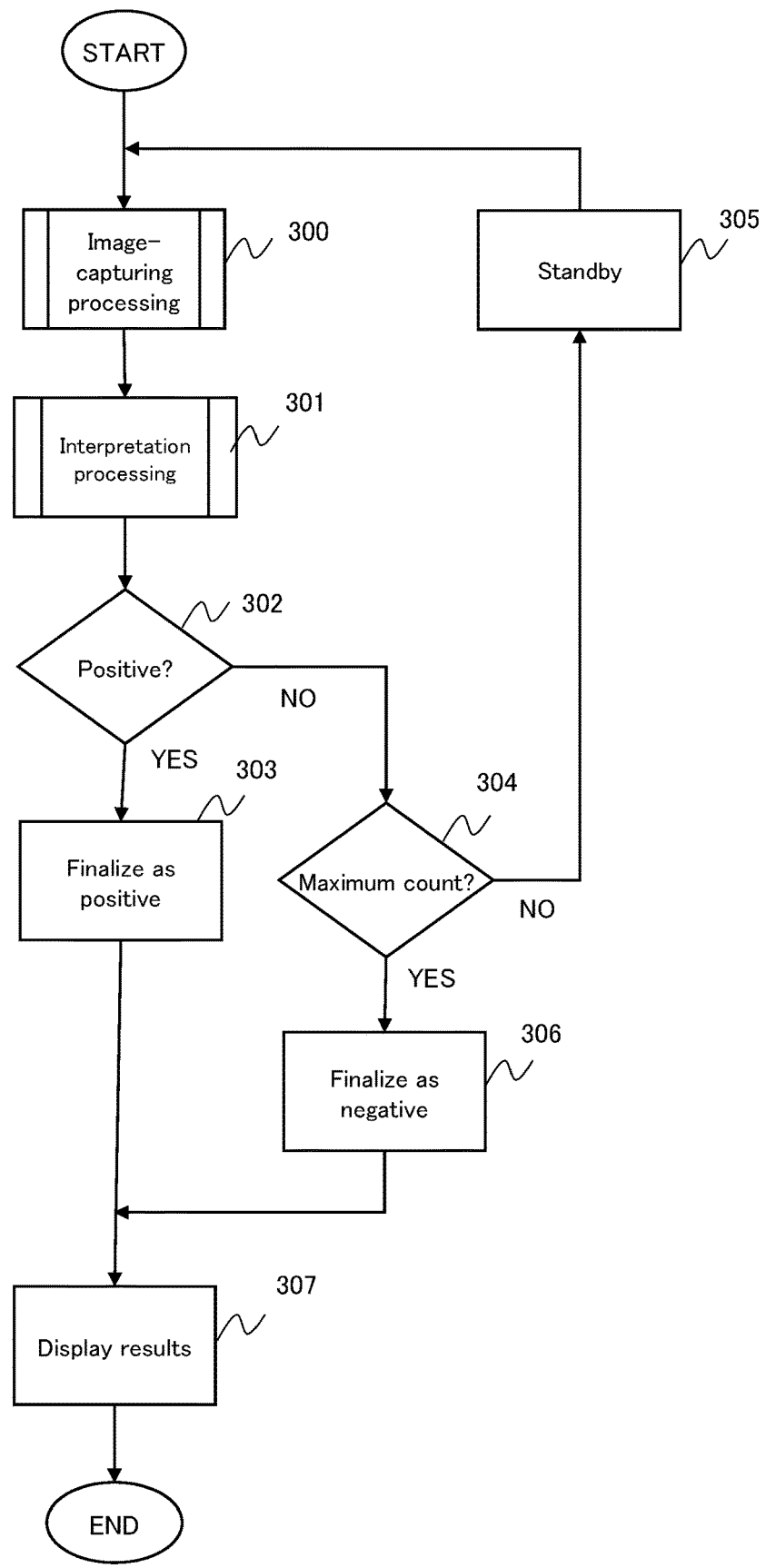
FIG. 8 is a flowchart of interpreting processing.

FIG. 8 is a flowchart of testing processing.

The processing part 15 first executes image-capturing processing in step 300, and executes interpretation processing in the subsequent step 301. In step 302, the processing part 15 interprets whether the testing results by the interpretation processing are positive or not. In a case where the results are positive, in step 303, the processing part 15 finalizes positive as the final testing results of the test kit 20 at that stage, and displays testing results of positive on the display 13 in step 307.

Whereas, in a case where the testing results are negative in step 302, in step 304, the processing part 15 interprets whether the count of times that the interpretation processing has been executed (hereinafter also referred to as "interpretation processing execution count") has reached a predetermined maximum count of times (M times) or not. If the interpretation processing execution count has not reached M times, the processing part 15 stands by in step 305 for a predetermined amount of time, and returns to step 300.

Conversely, if the interpretation processing execution count in step 304 has reached the maximum count, this means that an interpretation of negative has been made in all M times of interpretation processing, and accordingly in step 306, the processing part 15 finalizes negative as final testing results of the test kit 20, and displays the results of negative on the display 13 in step 307.

As described above, in the second operation mode, the interpretation processing is repeatedly executed with predetermined time intervals therebetween, up to the predetermined maximum count of times (M times), and accordingly testing and interpretation can be started at a stage partway while the liquid sample is flowing over the test strip 30. Also, positive is finalized at a stage of interpretation of positive being made at any one of interpretation processing, and negative is finalized at the stage of interpretation of negative being made in all of interpretation processing up to the maximum count of times. Accordingly, if at a stage where interpretation can be finalized even at a point in time partway through, the interpretation is finalized at that stage, whereby testing results can be swiftly finalized.

Note that while the same value for the coloration threshold value to compare the coloration indices with in the interpretation processing is used here for the M times of interpretation processing, without any change in particular, the coloration threshold value may be changed. The processing part 15 may set a first coloration threshold value to be used for an m'th count (wherein m is a natural number that is M−1 or less) of interpretation processing, and a second coloration threshold value used for m+1'th interpretation processing, to different values. The interpretation processing is repeated at a partway stage in which the liquid sample is flowing over the test strip 30, and accordingly the state of the analyte detection area changes part way through repeating the interpretation processing. According to this arrangement, the coloration threshold value used at a predetermined count of interpretation processing, and the coloration threshold value used at the next time following that predetermined count of interpretation processing, are set to different values, thereby enabling good interpretation using threshold values appropriate for the state of the analyte detection area.

Also, the processing part 15 may set a first coloration threshold value to be used for an m'th count (wherein m is a natural number that is M−1 or less) of interpretation processing to be a stricter value than a second coloration threshold value used for m+1'th count of assessment processing. The state of the analyte detection area gradually stabilizes as the developing of the liquid sample over the test strip 30 progresses, and accordingly, using the first coloration threshold value for the m'th count of assessment processing that is a stricter value for assessing a positive state than the second coloration threshold value for the m+1'th interpretation processing enables the possibility of erroneous interpretation of positive being made when the state of the assessment area is not yet stabilized to be reduced.

Specifically, in the interpretation processing up to before the final interpretation processing, a value that is stricter than the coloration threshold value used for the final interpretation processing may be used. With M=5, the predetermined second coloration threshold value may be used in the fifth time of interpretation processing, and the first coloration threshold value that is stricter than the second coloration threshold value may be used for the first through the fourth times of interpretation processing.

In a case of an index where the coloration index exceeding the coloration threshold value is in a positive state and equal to or smaller than the coloration threshold value is in a negative state, the first coloration threshold value is a larger value than the second coloration threshold value. For example, a value twice that of the second coloration threshold value may be used for the first coloration threshold value. In a case of an index where the coloration index exceeding the coloration threshold value is in a negative state and equal to or smaller than the coloration threshold value is in a positive state, the first coloration threshold value is a smaller value than the second coloration threshold value.

<Abnormal-State Operation>

As described above, an abnormal-state operation is an operation of the diagnostic testing-assessment device 10 when the test kit 20 is removed partway through the second operation mode.

As described above, the processing part 15 is able to comprehend whether or not the test kit 20 is loaded to the slot 11, by the detecting part 18. Also, the processing part 15 measures the time elapsed from the time point of starting the test in the second operating mode up to the time point of ending, and if the detecting part 18 detects that the test kit 20 has been removed from the slot 11 during the test (from the time point of starting to the time point of ending), the processing part 15 calculates the remaining time from that time point to the time point of ending (hereinafter also referred to as "remaining time"), which is displayed on the display 13. The time point of ending may be a time point at which execution of the interpretation processing for M times is ended, for example. A case in which the test kit 20 is removed partway through can be interprets to be the user performing visual interpretation thereof. According to the present embodiment, the remaining time up to the time point of ending testing is displayed when the test kit 20 is removed, and accordingly the user can know when visual interpretation should be performed.

Figure 9:
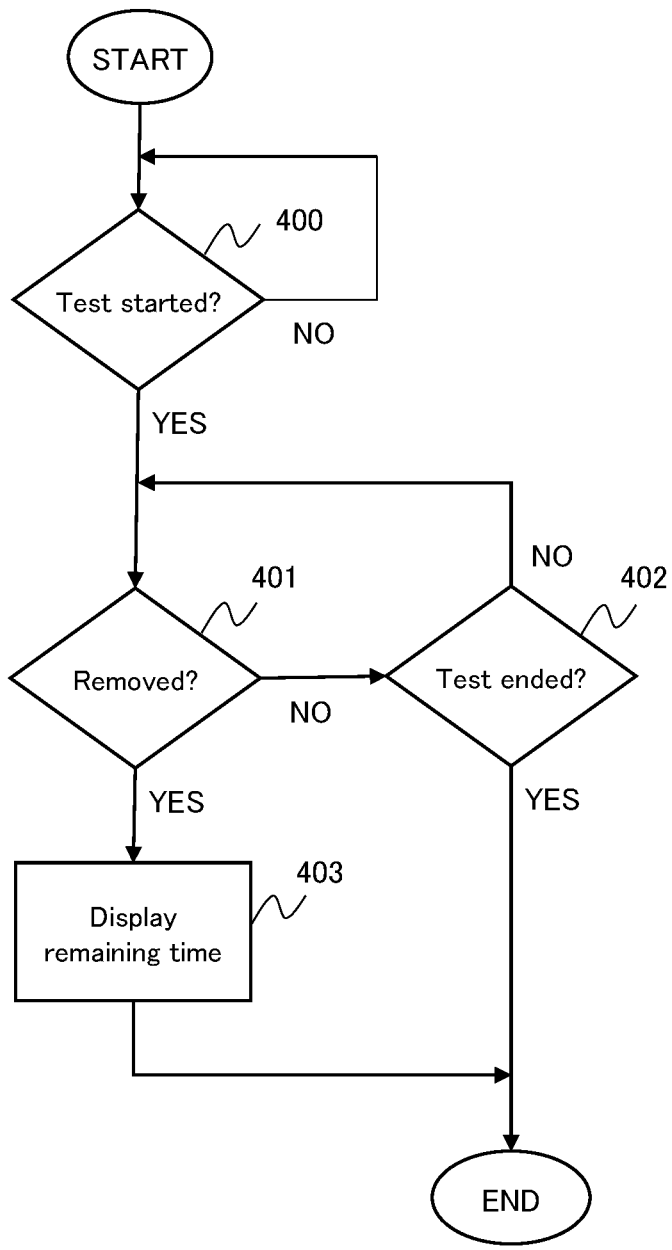
FIG. 9 is a flowchart of removal monitoring processing.

FIG. 9 is a flowchart of removal monitoring processing.

In step 400, the processing part 15 monitors start of testing in the second operation mode. When testing is started, the processing part 15 interprets in step 401 whether or not the test kit 20 is removed.

If the test kit 20 is not removed, in step 402, the processing part 15 interprets whether the testing has ended or not. If the testing has not ended, the processing part 15 returns to step 401. If the test kit 20 has been removed in step 401, the processing part 15 calculates the remaining time and displays on the display 13 in step 403.

If testing has ended in step 402, the processing part 15 ends the removal monitoring processing.

The above embodiment is an exemplification for the sake of description, and is not intended to limit the scope of the present invention to these embodiments alone. One skilled in the art will be able to carry out the present invention in various other forms, without departing from the scope of the present invention.

Modifications will be described below

<Modification 1>

An arrangement may be made as a modification of the present embodiment, in which, when the first operation mode is selected, the processing part 15 executes testing in the first operation mode as main processing, and meanwhile advances operations in the second operation mode as background processing, and when the user switches to the second operation mode, continues operations with the second operation mode as the main processing. Even in cases where the user intends to perform testing in the second operation mode but erroneously selects the first operation mode, and thereafter notices this and switches to the second operation mode, testing can be executed normally in the second operation mode.

<Modification 2>

An arrangement may be made as a modification of the present embodiment, in which the diagnostic testing device 10 automatically selects whether to perform testing in the first operation mode or in the second operation mode. The processing part 15 may interprets whether or not the sample developing detection area 36 exhibits a predetermined coloration state indicating that the liquid sample has sufficiently developed to the sample developing detection area 36, by the same method as for judging coloration states of the first analyte detection area 34 and the second analyte detection area 35, and if the predetermined coloration state is exhibited, may perform testing in the first operation mode, and display the determination results on the display 13. Also, if the sample developing detection area 36 does not exhibit the predetermined coloration state, the processing part 15 may perform testing in the second operation mode.

<Modification 3>

An arrangement may be made as a modification of the present embodiment, in which the sample developing detection area 36 uses a predetermined coloration state in the second operation mode.

Figure 10:
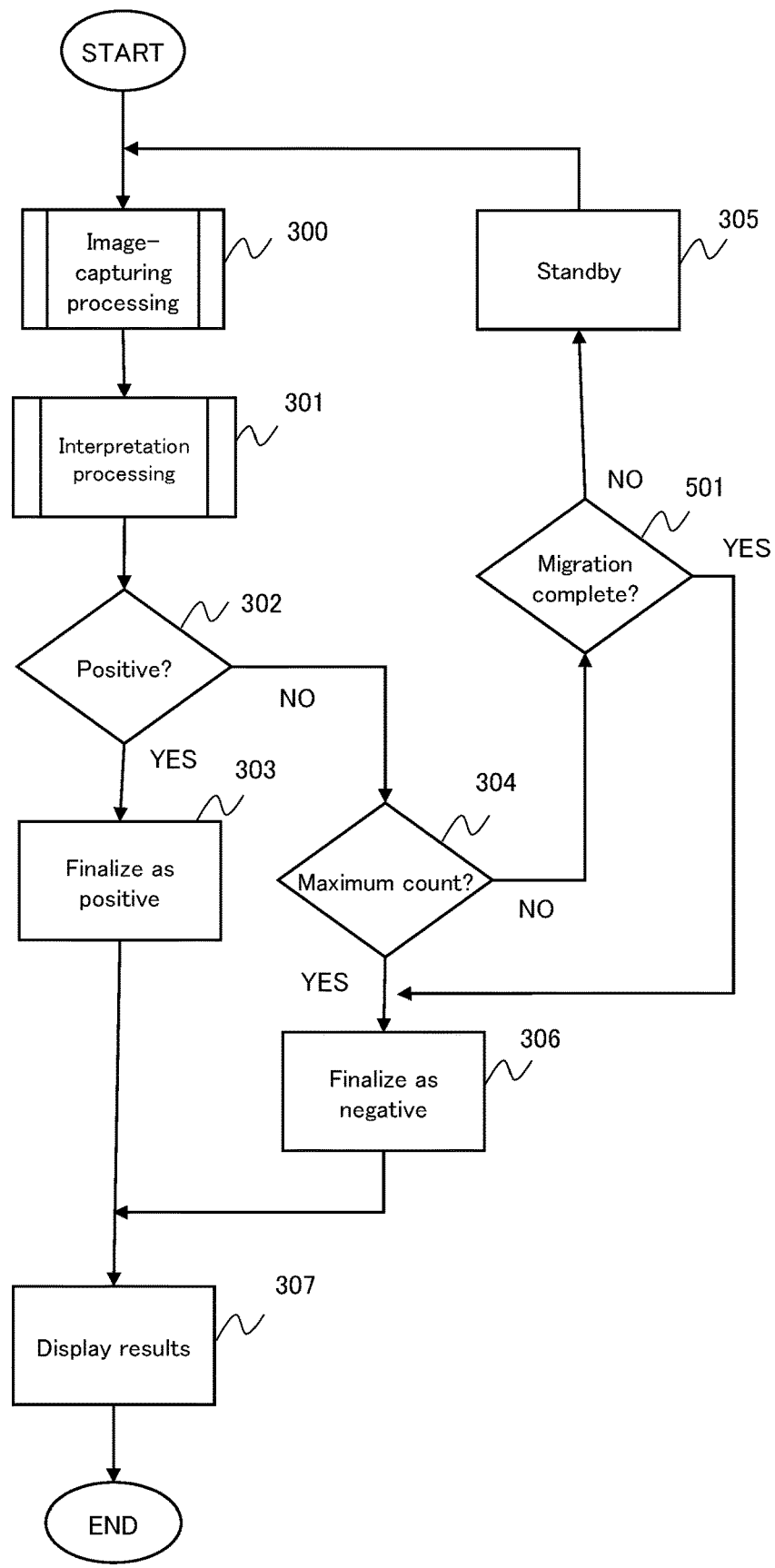
FIG. 10 is a flowchart of testing processing according to Modification 3.

FIG. 10 is a flowchart of testing processing in Modification 3. When the interpretation processing execution count has not reached the maximum count (M times) in step 304, the processing part 15 advances to step 501 rather than step 305. In step 501, the processing part 15 interprets whether or not the sample developing detection area 36 exhibits the predetermined coloration state, i.e., whether or not development of the liquid sample is complete. If the sample developing detection area 36 exhibits the predetermined coloration state, the processing part 15 deems development of the liquid sample to be complete, and advances to step 306. If the sample developing detection area 36 does not exhibit the predetermined coloration state, the processing part 15 advances to step 305. According to this example, the amount of time necessary for testing in the second operation mode can be reduced.

<Modification 4>

An arrangement may be made as a modification of the present embodiment, in which the value of the coloration threshold value for interpreting the coloration state of the first analyte detection area 34 and/or the second analyte detection area 35 is changed in accordance with the predetermined coloration state of the sample developing detection area 36.

An example has been shown in the present embodiment in which, with M=5 in the second operation mode, the processing part 15 uses the predetermined second coloration threshold value in the fifth time of interpretation processing, and uses the first coloration threshold value that is stricter than the second coloration threshold value for the first through the fourth times of interpretation processing. Conversely, an arrangement may be made in which, if the sample developing detection area 36 exhibits the predetermined coloration state (e.g., a coloration state close to maximum) in the interpretation processing of the first through the fourth times, the coloration state of the first analyte detection area 34 and/or the second analyte detection area 35 is interpreted using a value between the first coloration threshold value and the second coloration threshold value as a threshold value.

If the sample developing detection area 36 exhibits a coloration state close to maximum, the first analyte detection area 34 and the second analyte detection area 35 are conceivably in a state where the liquid sample has flowed downstream and there is little non-immobilized labeling substance causing noise. Accordingly, in such a case, the coloration threshold value can be lowered to finalize interpretation earlier, and the testing time can be shortened.

For example, if the first coloration threshold value is twice the second coloration threshold value, a value 1.6 times the second coloration threshold value may be used instead of the first coloration threshold value when the sample developing detection area 36 exhibits the predetermined coloration state.

The above modifications shown here are exemplary, as a matter of course, and it is needless to say that other modifications may be made.

REFERENCE SIGNS LIST

10 Diagnostic testing device
11 Slot
12 Operation button
13 Display
14 Image-capturing part
15 Processing part
16 Operating part
17 Display part
18 Detecting part
20 Test kit
21 Enclosure
22 Opening part
23 Result window
30 Test strip
31 Sample developing membrane
32 Sample drop pad
33 Labeling-substance-containing pad
34 Analyte detection area
35 Analyte detection area
36 Sample developing detection area (Control line area)

The invention claimed is:

1. A diagnostic testing device for immunochromatography, in which a liquid sample that potentially contains an analyte is flowed in an analyte detection area via a labeling-substance-containing area of a test strip, and a determination of a negative result or a positive result is made on the basis of a coloration state exhibited by the analyte detection area, the diagnostic testing device comprising:

an image sensor configured to obtain, once or more, data on a coloration index associated with the coloration state for a range including at least part of the analyte detection area; and a computer configured to deliver the determination of the negative result or the positive result on the basis of the data, wherein the computer is configured to operate in a first operation mode in which immediate determination is made after the coloration state has stabilized and a second operation mode in which the coloration state is repeatedly measured as the coloration state changes over time, a basic operation includes delivering a negative interpretation result when the data indicates, in at least one time of a maximum of N times (wherein N is greater than 1), that the coloration state of the analyte detection area is in a negative state, and delivering a positive interpretation result when the data indicates, in all of the N times, that the coloration state of the analyte detection area is in a positive state, in the first operation mode, the computer executes the basic operation once and delivers the determination of the negative result or the positive result, and in the second operation mode, the computer (i) repeatedly executes the basic operation up to a predetermined maximum count of M times (wherein M is greater than 1) at predetermined time intervals, (ii) delivers the determination of the positive result when, in one of the executions of the basic operation, the positive interpretation result is delivered, and (iii) delivers the determination of the negative result when, in all of the M times of executing the basic operation, the negative interpretation result is delivered, wherein the computer is further configured to lower a coloration threshold value for interpreting the coloration index of the analyte detection area, based on a coloration state of a sample developing detection area disposed on the test strip.

2. The diagnostic testing device according to claim 1, wherein the image sensor is configured to obtain the data on the coloration index, for the N times, for a range including at least part of the analyte detection area, and the computer is configured to execute the basic operation for the data obtained for the N times.

3. The diagnostic testing device according to claim 2, wherein the image sensor is configured to obtain the data on the coloration index, for two times, for the range including at least part of the analyte detection area, and the computer is configured to deliver a primary interpretation of whether the coloration state in the analyte detection area is in the negative state or in the positive state for the data of the coloration index for each of the two times, and a secondary interpretation of the positive interpretation result when results of the primary interpretations for the two times are in the positive state for both of the two times, and the negative interpretation result when a result for at least one of the two times is in the negative state.

4. The diagnostic testing device according to claim 2, wherein the computer is configured to deliver a primary interpretation of whether the coloration state in the analyte detection area is in the negative state or in the positive state for the data of the coloration index for each time in order, and when any data on the coloration index is determined to be negative in the primary interpretation, delivering the negative interpretation result at the respective $N^{th}$ time.

5. The diagnostic testing device according to claim 1, wherein
the computer is configured to execute processing of comparing a coloration index value of the data of the coloration index of the analyte detection area with the coloration threshold value for interpreting whether the coloration index indicates the negative state or the positive state, and
in the second operation mode, the computer is configured to use different values, which are a first coloration threshold value used in the basic operation for an m'th time (wherein m is a natural number that is M−1 or less), and a second coloration threshold value used in the basic operation for an m+1'th time.

6. The diagnostic testing device according to claim 5, wherein
the positive state is indicated when the coloration index value exceeds the coloration threshold value, and the negative state is indicated when the coloration index value is equal to or smaller than the coloration threshold value, the first coloration threshold value being a larger value than the second coloration threshold value, or
the negative state is indicated when the coloration index value exceeds the coloration threshold value, and the positive state is indicated when the coloration index value is equal to or smaller than the coloration threshold value, the first coloration threshold value being a smaller value than the second coloration threshold value.

7. The diagnostic testing device according to claim 1, further comprising:
a slot configured to be detachably loading thereto a test kit provided with the test strip; and
a detection sensor configured to detect whether the test kit is loaded to the slot, wherein
the diagnostic testing device executes testing of the test kit loaded to the slot, and
in the second operation mode, the computer is configured to measure a time elapsed from a time point of starting a test to a time point of ending, and display, when the detection sensor detects that the test kit has been removed from the slot during a time from the time point of starting to the time point of ending, a remaining time to the time point of ending.

8. The diagnostic testing device according to claim 7, wherein the time point of ending is a time point at which execution of the M times of the basic operation ends.

9. A diagnostic testing method for immunochromatography, in which a liquid sample that potentially contains an analyte is expanded in an analyte detection area via a labeling-substance-containing area of a test strip, and a determination of a negative result or a positive result is made on the basis of a coloration state exhibited by the analyte detection area, the method comprising:
obtaining, once or more, data on a coloration index associated with the coloration state for a range including at least part of the analyte detection area; and
operating in a first operation mode in which immediate determination is made after the coloration state has stabilized and operating in a second operation mode in which the coloration state is repeatedly measured as the coloration state changes over time, wherein
a basic operation includes delivering a negative interpretation result when the data indicates, in at least one time of a maximum of N times (wherein N is greater than 1), that the coloration state of the analyte detection area is in a negative state and delivering a positive interpretation result when the data indicates, in all of the N times, that the coloration state of the analyte detection area is in a positive state,
the first operation mode includes executing the basic operation once and delivering the determination of the negative result or the positive result, and
the second operation mode includes
(i) repeatedly executing the basic operation up to a predetermined maximum count of M times (wherein M is greater than 1) at predetermined time intervals,
(ii) delivering the determination of the positive result when, in one of the executions of the basic operation, the positive interpretation result is delivered, and
(iii) delivering the determination of the negative result when, in all of the M times of executing the basic operation, the negative interpretation result is delivered,
wherein the diagnostic testing method further includes lowering a coloration threshold value for interpreting the coloration index of the analyte detection area, based on a coloration state of a sample developing detection area disposed on the test strip.

10. The diagnostic testing device according to claim 1, wherein
when the first operation mode is selected, the computer operates in the first operation mode as main processing, and operates in the second operation mode as background processing, and
when the second operation mode is selected by switching, the computer continues operating in the second operation mode as the main processing.

11. The diagnostic testing method according to claim 9, further comprising
when the first operation mode is selected, operating in the first operation mode as main processing, and operating in the second operation mode as background processing, and
when the second operation mode is selected by switching, continuing operating in the second operation mode as the main processing.

* * * * *